United States Patent [19]

Klingel

[11] Patent Number: 5,121,539

[45] Date of Patent: Jun. 16, 1992

[54] APPARATUS AND METHOD FOR CUTTING STACKED SHEET-LIKE WORKPIECES

[75] Inventor: Hans Klingel, Moeglingen, Fed. Rep. of Germany

[73] Assignee: Trumpf GmbH & Company, Ditzingen, Fed. Rep. of Germany

[21] Appl. No.: 731,638

[22] Filed: Jul. 17, 1991

[51] Int. Cl.⁵ .......................................... B23Q 3/157
[52] U.S. Cl. .................................. 483/53; 29/34 B; 409/131; 483/61;65
[58] Field of Search ............... 29/568, 34 B, 796, 788, 29/525.2; 414/749, 736; 211/1.5; 409/131, 132

[56] References Cited

U.S. PATENT DOCUMENTS

| | | | |
|---|---|---|---|
| 4,528,742 | 7/1985 | Peacock | 29/568 |
| 4,545,107 | 10/1985 | Bellmann et al. | 29/568 |
| 4,577,389 | 3/1986 | Shultz | 29/568 |
| 4,658,493 | 4/1987 | Saeki et al. | 29/568 |
| 4,706,371 | 11/1987 | McMurtry | 29/568 |
| 4,729,159 | 3/1988 | Henneberg et al. | 29/568 |
| 4,736,512 | 4/1988 | Gusching et al. | 29/568 |
| 4,833,770 | 5/1989 | Esser et al. | 29/568 |
| 4,866,835 | 9/1989 | Novak | 29/568 |
| 4,890,969 | 1/1990 | Esser | 414/749 X |

Primary Examiner—William Briggs

[57] ABSTRACT

A machine for the simultaneous maching of a stack of plate-like workpieces has a frame with an overhead arm portion, a worktable below the arm portion, and a workpiece guidance assembly for moving the workpiece stack on the worktable. A rotary tool drive assembly and a riveting assembly are provided in the arm portion, and a tool storage assembly is spaced from the arm. A tool changer assembly has a pair of carrier rails extending from the tool storage assembly to adjacent the rotary tool drive assembly, and they are spaced to opposite sides thereof. A pair of tool carriers are reciprocatable on the rails for transporting tools between the tool storage assembly and the rotary tool drive assembly to effect insertion into and removal from said tool assembly of such tools. The carriers are vertically and horizontally movable relative to the rails to engage tools stored in the tool storage means and to cooperate with the rotary tool drive assembly to effect insertion of tools thereinto and removal of tools therefrom. A computer is operative to control the riveting and rotary tool drive assemblies and the tool changer and workpiece guidance assemblies.

15 Claims, 8 Drawing Sheets

APPARATUS AND METHOD FOR CUTTING STACKED SHEET-LIKE WORKPIECES

BACKGROUND OF THE INVENTION

The present invention relates to machine tools, and, more particularly, to machine tools for simultaneously machining a stack of plate-like workpieces.

In Herb et al. U.S. Pat. Nos. 4,270,253 and 4,462,147, there is described a machine tool for simultaneously mounting a stack of plate-like workpieces upon a base member, riveting the plate like workpieces thereto, drilling and riveting the workpieces to the base member, machining the group of workpieces by movement of the assembled stack relative to a machining station, and thereafter drilling the rivets so that the individual workpieces may be disassembled from the stack. This type of machine has proven highly satisfactory for machining of a multiplicity of relatively thin workpieces with similar contours. As described in the Herb et al. patents, it is generally necessary to replace the router bit or the like with different tools to enable the cutting of various contours which might be required in a particular workpiece.

In the machine illustrated in the aforementioned Herb et al. patents, the machine tool is one which has a series of stations between which the workpieces would be moved to effect the initial drilling, to effect riveting, to effect the machining, and to effect drilling of the rivets after the machining and any intermediate drilling steps have been performed. As will be appreciated, multiple work stations complicate the problems inherent in achieving precision operations on a workpiece and the control system for effecting such motion of the workpieces among the several work stations. Moreover, the machine tool of the aforementioned Herb et al. patents required a relatively long shutdown of the machine tool to effect the required manual exchange of router bits or other tools in the machining station, and frequently of the drill bits employed in the drilling station.

It is an object of the present invention to provide a novel machine tool for simultaneously drilling, riveting and machining a multiplicity of workpieces in which guidance of the workpieces relative to the machining station is simplified and in which tools may be automatically and rapidly exchanged.

It is also an object to provide such a machine tool in which but two work stations are required and in which the tools in the machining station may be exchanged rapidly.

Another object is to provide such a machine tool in which there is included a tool storage assembly in which a multiplicity of drill bits and router bits are stored. A tool changer mechanism rapidly selects desired tools in accordance with computer instructions and effects the exchange of tools in the machining station.

A further object is to provide such a machine tool which enables safe and rapid operation and exchange of tools and which may be readily controlled by computer program.

SUMMARY OF THE INVENTION

It has now been found that the foregoing and related objects may be readily attained in a machine for the simultaneous machining of a stack of plate-like workpieces. The machine has a frame with an overhead arm portion, a worktable below the arm portion, and a workpiece guidance assembly for moving a stack of workpieces on the worktable below the arm along a Y-axis parallel to the arm and an X-axis perpendicular thereto. A rotary tool drive assembly in the arm portion defines a first work station, and a riveting assembly in the arm portion defines a second work station which is spaced in the X-axis from the first work station.

Spaced in the Y-axis from the arm is a tool storage assembly having a support portion adapted to store a multiplicity of tools in a plurality of rows extending in the Y-axis and spaced apart along the X-axis. A tool changer assembly comprises a pair of carrier rails extending in the Y-axis from the tool storage assembly to adjacent the rotary tool drive assembly, and the rails are spaced in the X-axis to opposite sides of the tool drive assembly. Reciprocatable on the rails for transporting tools between the tool storage assembly and the rotary tool drive assembly is a pair of tool carriers, and they effect insertion into, and removal from, the tool assembly of tools. They are vertically movable relative to the rails to engage the tools stored in the tool storage means and to cooperate with the rotary tool drive assembly to effect insertion of tools thereinto and removal of tools therefrom. The tool carriers are also movable on the rails in the X-axis for movement between a first position in alignment with the rotary tool drive means and a second position spaced to the side thereof.

A computer control is operative to control the riveting and rotary tool drive assemblies and the tool changer and workpiece guidance assemblies.

Generally, a multiplicity of tool storage cartridges are provided on the support portion of the tool storage assembly, and the carriers are adapted to grip the tool storage cartridges to effect movement thereof. Each of the cartridges is adapted to store a tool having a shank extending upwardly therefrom for engagement in the rotary tool drive means, and the tool carriers are movable downwardly and upwardly relative to the rotary tool drive assembly and include releasable tool engaging means to effect tool engagement in the drive means and tool removal therefrom. Desirably, the cartridges releasably seat a stripper, and the rotary tool drive assembly includes a stripper support portion so that the vertical movement of the carrier relative to the tool drive assembly deposits or removes the stripper.

Preferably, two rows of tool cartridges are provided in the tool storage assembly, and there is included means for relative movement in the X-axis of the rows of cartridges and the tool carriers to effect vertical alignment thereof. The tool carriers are movable along the rails in the Y-axis, vertically thereon (the Z-axis) and transversely thereof in the Y-axis.

In the preferred embodiment, a closure on the frame provides a protective closure about the work stations and it is movable between a first protective position disposed about the rotary tool drive assembly and riveting assembly and a second open position in which the carriers may travel on the rails to and from the rotary drive assembly. The closure desirably includes a pair of doors pivoted on the frame, and means for opening and closing the doors.

In simultaneously machining a stack of plate-like workpieces, a stack of plate-like workpieces are initially assembled on a base plate and clamped thereto. One of the tool carriers is moved vertically relative to its rail to engage a drill stored on the support portion of the tool storage means and is then moved on its rail to a position adjacent the arm portion. It is then moved on the rail in the X-axis into alignment with the rotary tool drive means, and thereafter moved relative to the rotary tool drive means to engage the drill therein. The tool carrier is then moved on the rail in the X-axis to a position displaced to one side of the arm.

At this point the assembled stack is moved relative to the rotary drive assembly to drill a multiplicity of holes therein, after which it is moved relative to the riveting station to engage rivets in the holes.

The tool carrier is moved on the rail to remove the drill from the rotary drive assembly. A second tool carrier, which has been moved on the other of the rails to engage a milling tool, is moved on the other rail to insert the milling tool in the rotary drive assembly. The assembled stack is now moved relative to the rotary drive station to machine desired patterns in the workpieces. The tool carrier on the other rail is moved to remove the drill.

After all milling operations have been completed, a drill is again engaged in one of the tool carriers, and the carrier is advanced and moved on its rail to insert the drill in the rotary drive assembly. The assembled stack is then moved relative to the first work station and the rivets are drilled to remove them and thereby permit disassembly of the workpieces of the stack from the base plate.

Generally, the machining method will require several steps of replacing different milling tools in the tool carriers and thereby in the rotary drive assembly to effect machining of various patterns in the workpieces of the stack. Preferably, two rows of tool cartridges are provided in the tool storage assembly and they extend parallel to the rails, and the support portion is moved relative to the rails in the X-axis to effect vertical alignment of the rows of cartridges and the tool carriers.

DETAILED DESCRIPTION OF THE PREFERRED EMBODIMENT

Figure 1:
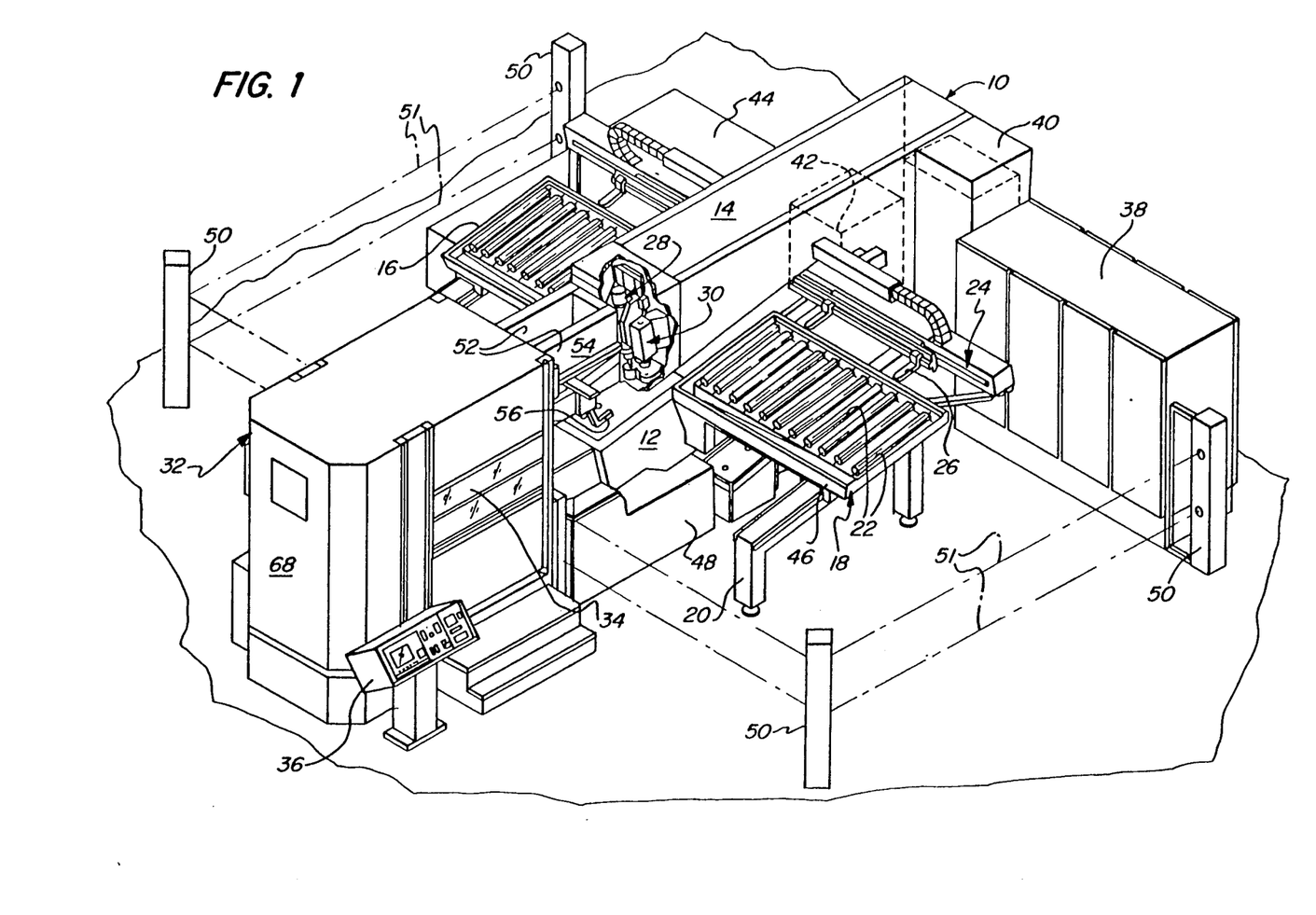
FIG. 1 is a perspective view of a factory installation employing a machine tool embodying the present invention with a portion of the enclosure broken away to reveal internal construction.

Turning first to FIG. 1, therein illustrated is a factory installation of a machine tool embodying the present invention. The machine tool has a C-shaped frame generally designated by the numeral 10 with a bed 12 and an overhead arm 14 extending over the bed 12 and providing a throat therebetween. Extending perpendicularly to either side of the bed 12 are a pair of worktables generally designated by the numeral 16, 18 which are inclined to the horizontal and which are slidably supported for movement in the Y-axis upon the supports 20. Each worktable 16, 18 has a multiplicity of rollers 22 upon which stacks of workpieces (not shown) may be readily moved.

An X-Y guidance system generally designated by the numeral 24 is provided on the bed 12 to the rear of the worktables 16, 18, and it has a series of clamps 26 spaced therealong adapted to grip the workpiece assembly (not shown) for movement in the X-Y axes on the worktables 16, 18 relative to the overhead arm 14. The positioning of the worktables 16, 18 in the Y-axis may also be controlled by the guidance system 24.

At the outer end of the arm 14 and exposed by the cutaway section are a rotary tool drive assembly generally designated by the numeral 28 and a riveting assembly generally designated by the numeral 30.

Spaced from the overhead arm 14 is a tool storage assembly generally designated by the numeral 32 which has a pivoted side closure 34, and a computer control console 36 is spaced to one side thereof.

Electrical and computer controls for the machine tool are located in the cabinet 38. The pneumatic controls and lubrication controls are located in the cabinet 40, and the controls for the hydraulic system are located in the cabinet 42.

The coolant system is located in the cabinet 44 and coolant flows through conduits (not shown) to the overhead arm 14 to discharge about the rotary tool drive assembly 28 to facilitate the machining operation, and the coolant is collected in drain pans 46 below the worktables 16, 18 from which it flows into the sump 48, and it is filtered and recycled.

Four light beam sensor posts 50 are spaced about the work area and define a protected area designated by the beams 51, and a person entering the protected area will automatically terminate machine operation.

Extending forwardly from the tool storage assembly 32 are a pair of rails 52 of the tool changer assembly generally designated by the numeral 54, and tool carriers generally designated by the numeral 56 move between the storage assembly 32 and the rotary tool drive assembly 28 on the rails 52.

Figure 2:
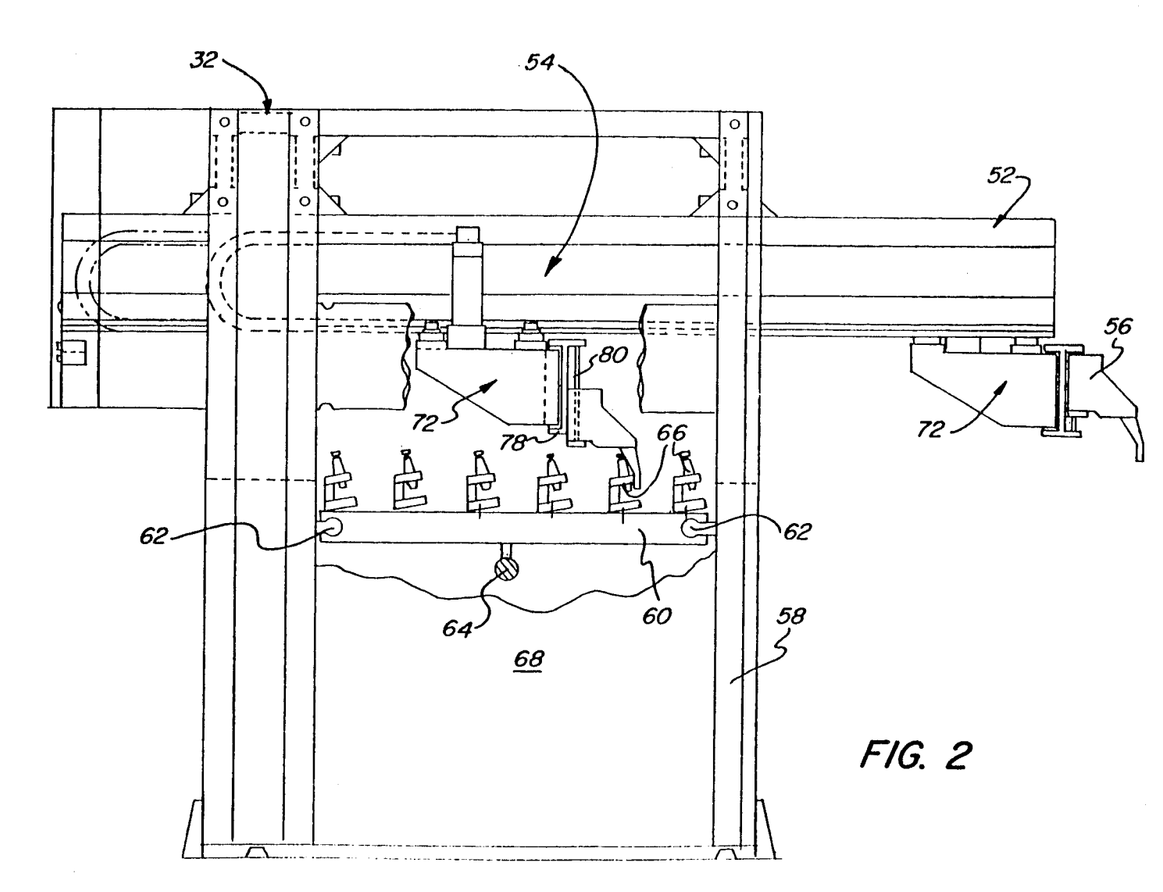
FIG. 2 is a side elevational view of the tool storage assembly and of the tool changer assembly with portions of the tool storage assembly removed or broken away for illustration of internal structure.
Figure 3:
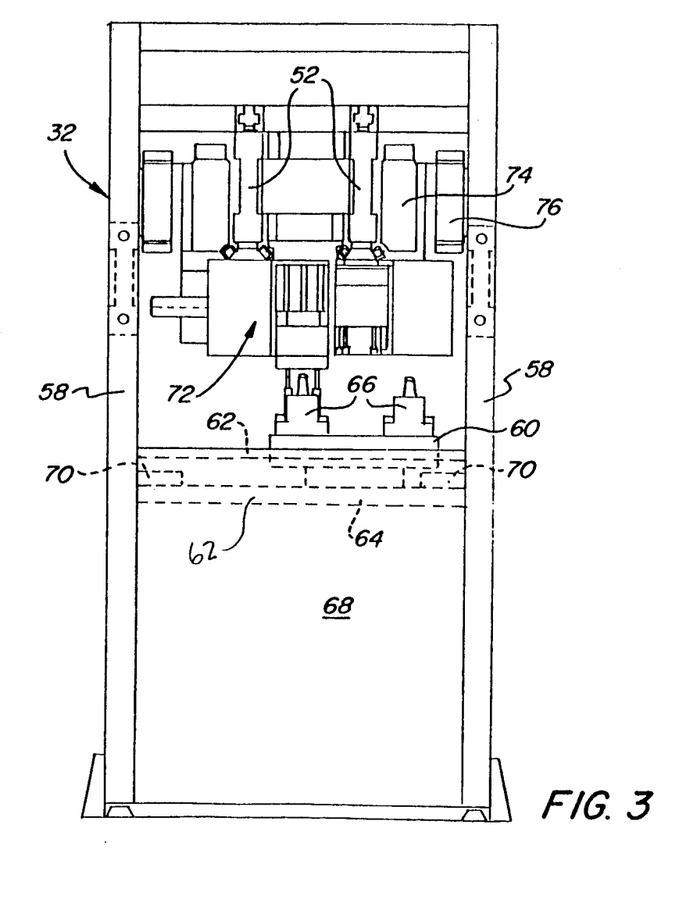
FIG. 3 is a rear elevational view of the tool storage assembly with the wall panels removed to show internal construction.

Turning next to FIGS. 2 and 3, therein is illustrated the tool storage assembly 32 which has a sturdy frame 58 in which the storage platform 60 is slidably supported on rails 62 for movement transversely of the frame 58 by a pneumatic drive mechanism only fragmentarily illustrated by the numeral 64. Seated on the surface of the storage platform 60 are a series of tool cartridges generally designated by the numeral 66 which are arranged in rows. The storage assembly 32 also includes a series of panels 68 mounted on the frame 58 and providing walls for the enclosure as well as the movable side closure 34 (seen in FIG. 1).

As seen in FIG. 3, two rows of tool cartridges 66 are provided on the movable storage platform 60 which can move from side to side on the transverse rail 62 of the frame 58 in order to be in vertical alignment below either one of the rails 52 of the tool changer assembly 54. Stops 70 on the frame 58 limit the transverse movement provided by the pneumatic cylinder 64.

Turning in detail to the tool changer assembly 54, the pair of support rails 52 are mounted on the upper portion of the frame 58 and extend towards the arm 14 above the bed 12, and they also extend rearwardly of the frame 58. The tool carriers 56 are supported on gripper carriages generally designated by the numeral 72 which are reciprocatable along the rails 52 by the servodrivers 74 which are powered by the motors 76.

The carriages 72 have mounted thereon cross slides 78 which provide movement of the tool carriers 56 transversely of the rails 52 in response to action of pneumatic cylinders (not shown), and the tool carriers 56 are vertically movable on the vertical rails 80 in response to action of pneumatic cylinders (not shown). The movement of the carriages 72 and the carriers 56 will be described more fully hereinafter.

Figure 4:
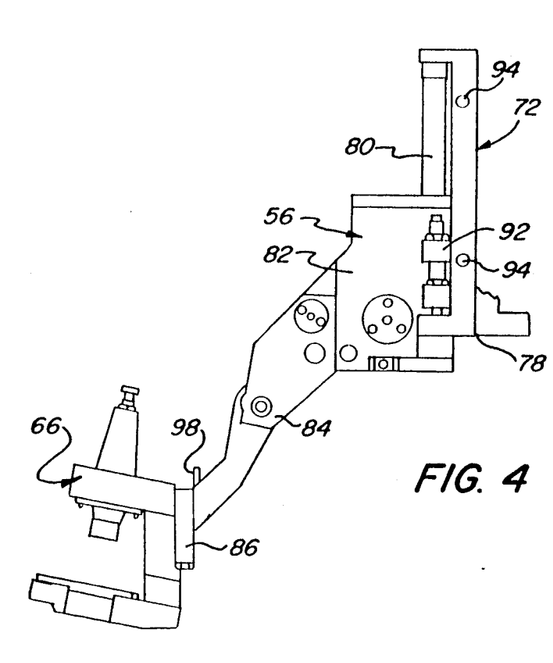
FIG. 4 is a side elevational view of a tool carrier supporting a cartridge.
Figures 5, 6:
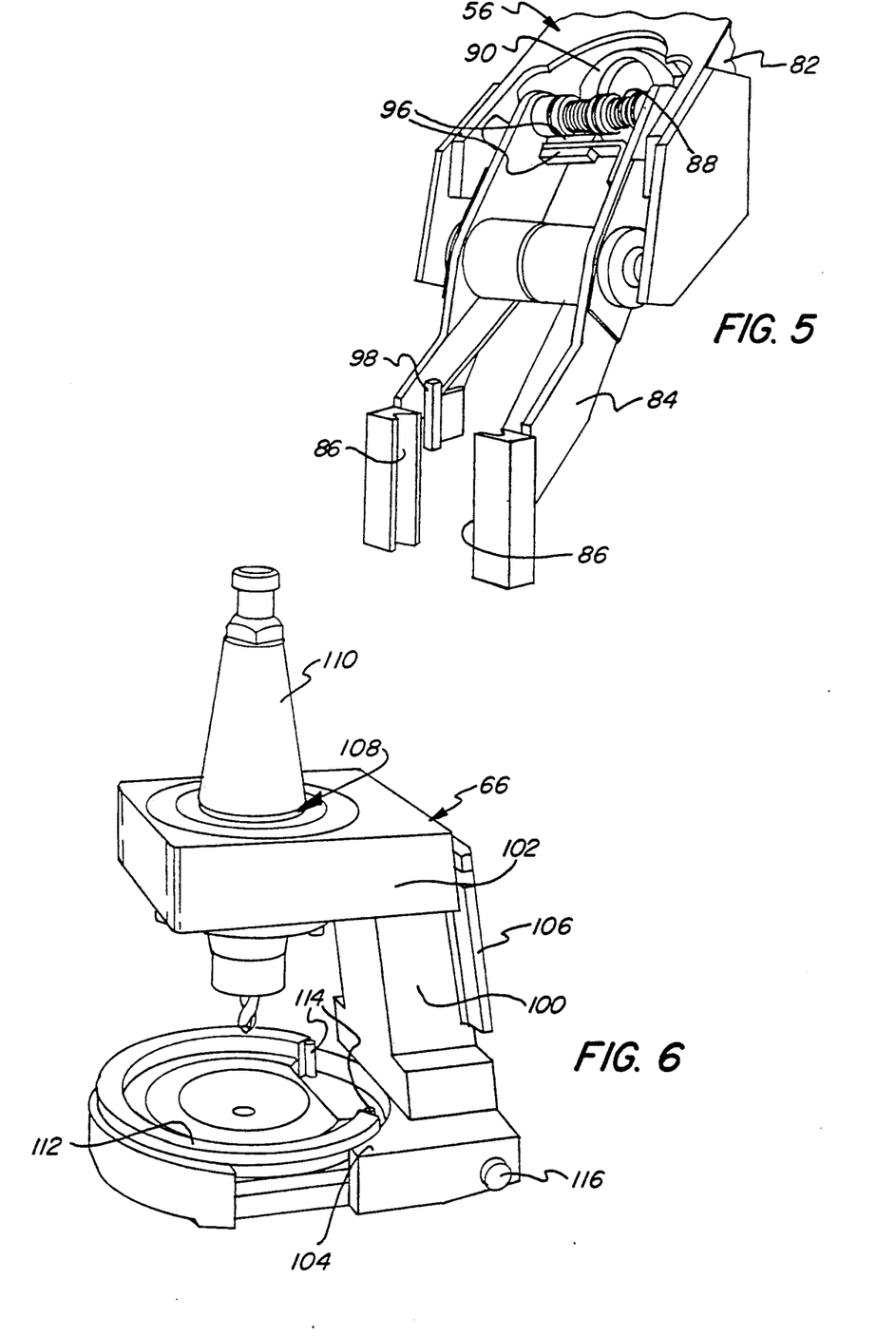
FIG. 5 is a perspective view of the tool carrier seen in FIG. 4 with the cartridge removed.
FIG. 6 is a perspective view of the cartridge of FIG. 4.

Turning now to the carriers 56 seen in FIGS. 4 and 5, these include a mounting portion 82 slidably supported on the vertical rails 80 in the cross slide 78 and the depending legs 84 which have opposed clamping jaws 86 at their lower ends. The release spring 88 biases the legs 84 apart, and the cam discs 90 are driven by a double acting pneumatic cylinder and rack drive (not shown) to push the clamping jaws 86 together to effect clamping of a tool cartridge 66 therebetween.

An adjustable stop 92 enables adjustment of the up-/down position, and sensors 94 enable determination of the up/down positions of the carrier 56. Sensors 96 enable determination of the open/closed position of the jaws 86. The sensor 98 enables determination that a cartridge 66 is clamped in the jaws 86.

Turning now to FIG. 6 for the detail of the cartridge 66, it has a body 100 with a top support 102 and a bottom tool support 104 extending forwardly therefrom. Extending generally vertically along the rear surface of the body 100 is a plate 106 providing side portions for engagement in the jaws 86. Seated in an aperture in the top tool support 102 is a drilling/milling cutter 108 with an expansion chuck 110 for seating in the rotary tool drive assembly 28. Seated between the arms 110 of the bottom tool support 104 is a stripper 112 which abuts the alignment pins 114. A sensor 116 is also provided.

Figure 7:
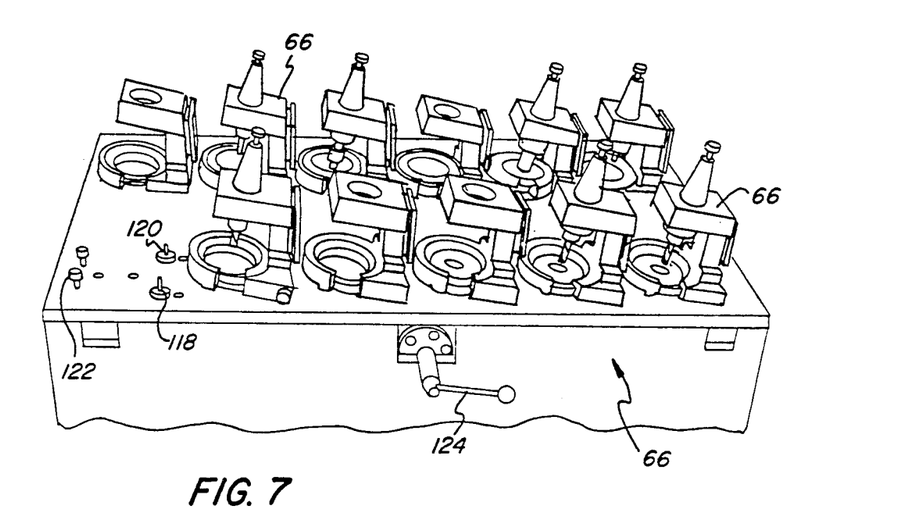
FIG. 7 is a perspective view of the tool support portion of the tool storage assembly with tool cartridges supported thereon.

As seen in FIG. 7, the storage platform 60 is shown in greater detail as configured to provide stations for two rows of six cartridges 66 each aligned in the Y axis direction (aid paired in the X-axis direction). Each cartridge position includes damping rings 118 upon which the cartridge 66 seats, an indexing pin 120 for locating the cartridge 66, and support buffers 122. As can be seen, the cartridge 66 are supported with their bottom supports 104 inclined. The storage platform 60 may be slid outwardly through the side closure 34 of the tool storage assembly 32 to facilitate exchange of cartridges 66 by disengaging the support platform 60 from the stops 70 by means of the release lever 124.

Figure 8:
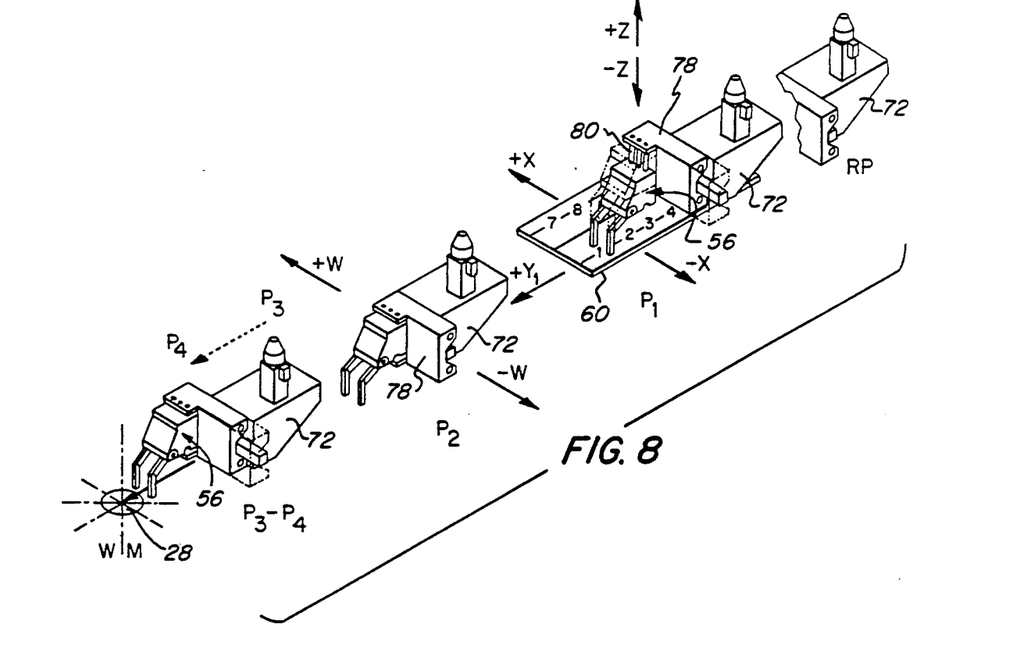
FIG. 8 is a schematic view showing the several motions and positions of the tool carrier.

The relative motion of the tool carrier 56 on its carriage 72 and of the storage platform 60 is diagrammatically illustrated in FIG. 8. The position RP represents a reference position only for the right hand assembly as seen from the work station. In position 1 (P1), the tool carrier 56 has been moved in the X-axis to its leftward position in alignment with the right row of cartridges (not shown), and it is in its lowered position on the vertical rails 80 in the Z-axis to engage or deposit a cartridge 66 on the storage platform 60. However, as is also shown, the platform 60 is also movable in the X-axis to align the other row of cartridges therewith.

Position 2 (P2) is the bypass position of the carrier 56 on the rails 52 (not shown) wherein this carrier 56 is moved in the X-axis to the right hand position on the cross slide 78 so that it is spaced to the side of the rotary tool drive assembly 28.

Position 3-4 (P3-P4) is the changing position where it has been moved along the X-axis (W-direction) into alignment with the rotary tool drive assembly, but in P-3 it is spaced outwardly therefrom and P4 represents the tool change position in which it has been moved in the Y-axis into axial alignment with the rotary tool drive assembly 28 for deposit of the tools in the cartridge 66 which it is carrying of for removal of the tools therefrom.

Figure 9:
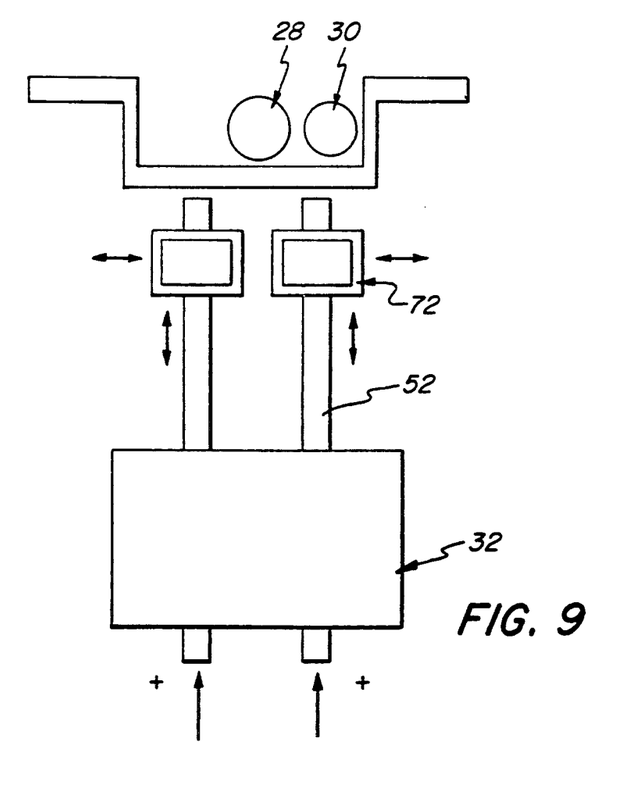
FIG. 9 is a schematic view showing the relationship between the tool storage assembly, the rails and tool carriers of the tool changer assembly, and the rotary drive assembly of the machine tool.

The movement of the carriage 72 is diagrammatically illustrated in FIG. 9 wherein the two carriages 72 are shown as moved outwardly of the tool storage assembly 32 on their rails 52 to a position adjacent but spaced from the overhead arm 14. Neither is aligned with the rotary tool drive assembly 28 and each is movable on its rail in the X-axis away from the other to a non-interferring position and to a position towards the other into alignment with the assembly 20, and it is movable further in the Y-axis along the rails 52 to be in vertical alignment with the tool assembly 28.

Figure 10:
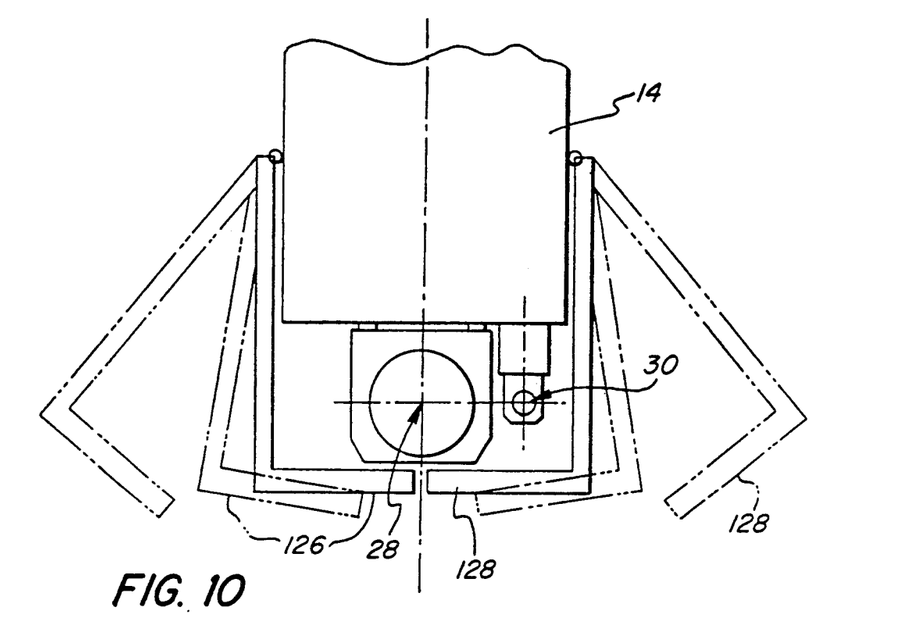
FIG. 10 is a diagrammatic view showing the pivotal motion of the doors of the safety enclosure about the riveting and rotary drive tool stations.

In FIG. 10, the operation of the two closure elements 126, 128 of the protective closure is illustrated. The closure elements 126, 128 are generally L-shaped to provide a long leg which is pivotably mounted on the side of the arm 14 and short legs which are disposed outwardly of the rotary tool drive assembly 28 and riveting assembly 30. The closure elements 126, 128 are pivoted from the safety or closed position shown in full line to the full open position shown in phantom line by pneumatic drive cylinders (not shown) to permit exchange of tools in the rotary drive assembly 28.

Figure 11:
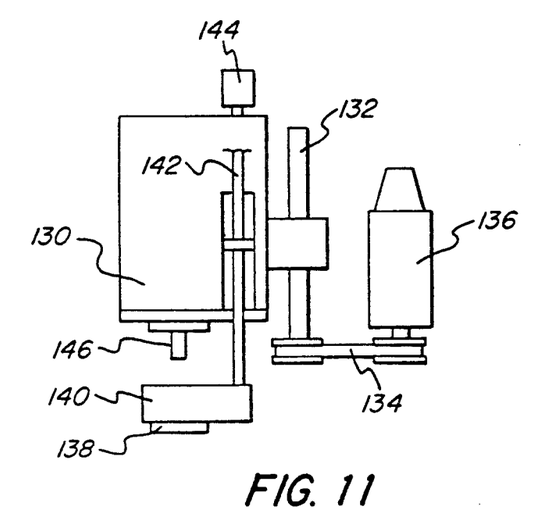
FIG. 11 is a diagrammatic view of the rotary drive tool assembly.

Turning next to FIG. 11, the principal elements of the rotary tool drive assembly 28 are illustrated. The slide carriage 130 which contains the rotary drive spindle and tool clamping mechanism (not shown) is vertically movable on the rotary spindle 132 by the belt drive 134 of the drive motor 136. The presser foot 138 is seated in the carrier or support 140 which is movable vertically by the piston 142 which is driven by the hydraulic drive 144. The foot 138 will firmly clamp the workpiece stack (not shown) about the rotary tool bit 146.

Figure 12:
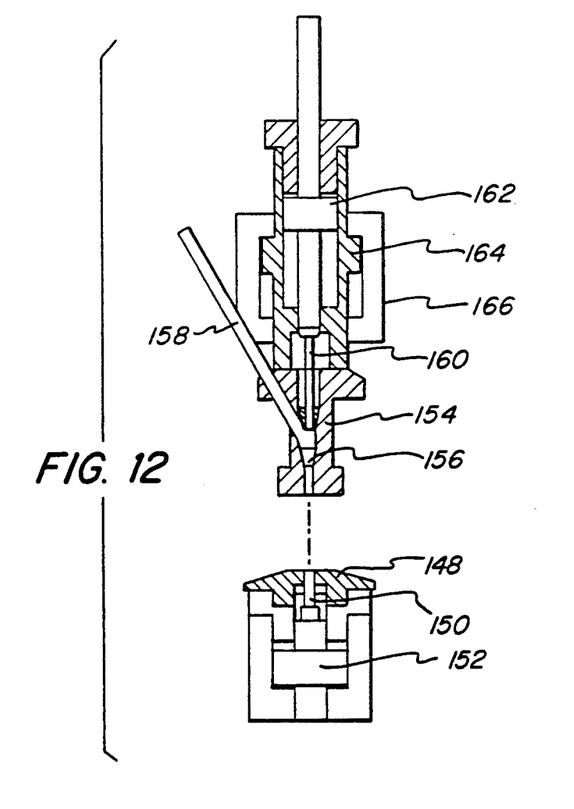
FIG. 12 is a diagrammatic view of the riveting assembly.

In FIG. 12, the principal elements of the riveting assembly 30 are illustrated. In the bed 12 of the frame 10 is the lower rivet tooling comprising the punch guide 148 in which is disposed the lower rivet pin 150 which is seated on the lower rivet block 152. In the arm 14 is the upper rivet tooling which include the head 154 having a central passage 156 into which rivets (not shown) are delivered by the supply tube 158. The upper rivet pin 160 bears against the upper rivet block 162 and is reciprocatable thereby in the passage 156 by a hydraulic drive (not shown). The presser foot 164 is movable in the housing 166 by hydraulic fluid to firmly clamp the workpieces during the riveting operation.

Figure 13A:
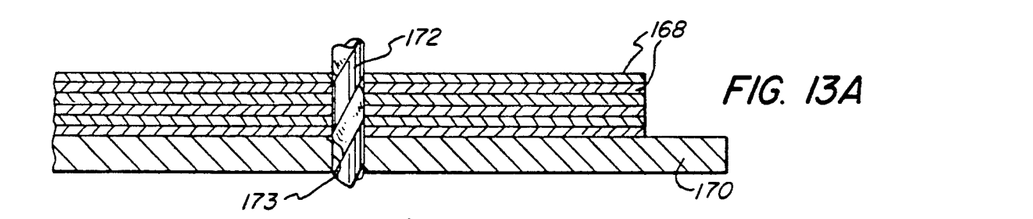
FIGS. 13A-13E are a series of partially schematic views showing the several steps in the machining method provided by the machine tools of the present invention.

The operations performed by the machine on a workpiece are diagrammatically illustrated in FIGS. 13A-13E. In FIG. 13A, the stack of workpieces 168 have been placed upon a base plate 170 and clamped together in the machine guidance system (not shown). A drill bit 172 in the rotary drive assembly (not shown) drills a series of holes 173 through the stack of workpieces 168 and into the base plate 170 at various points about the workpiece stack.

Figure 13B:
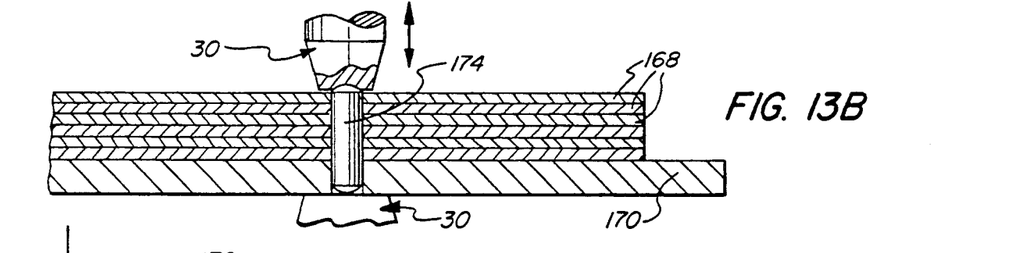

In FIG. 13B, rivets 166 are inserted into the holes and upset by the riveting assembly 30 to secure the stack of workpieces 160 firmly in assembly upon the base plate 162.

Figure 13C:
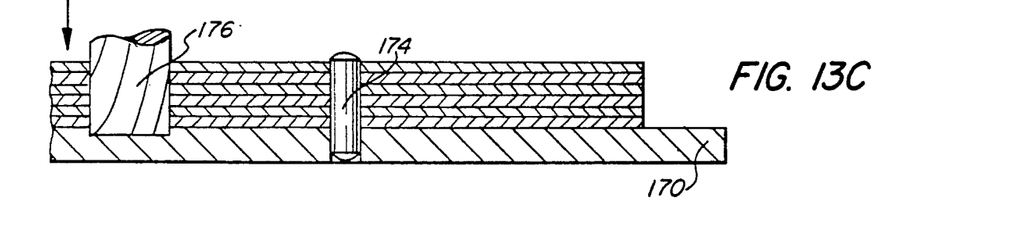
Figure 13D:
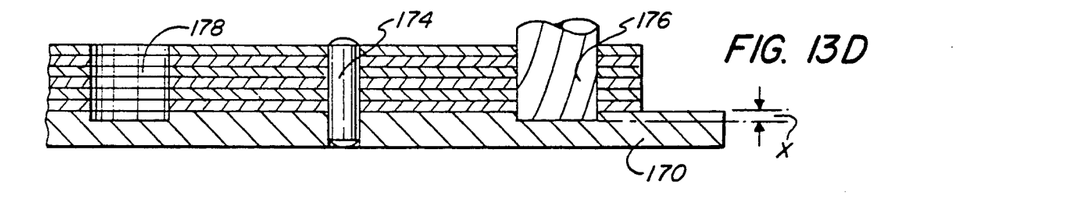

In FIGS. 13C and 13D, a milling cutter 176 in the rotary tool drive assembly (not shown) is milling a cutout 178 the entire stack of workpieces 168 and also penetrates into the base plate 170 a distance X.

Figure 13E:
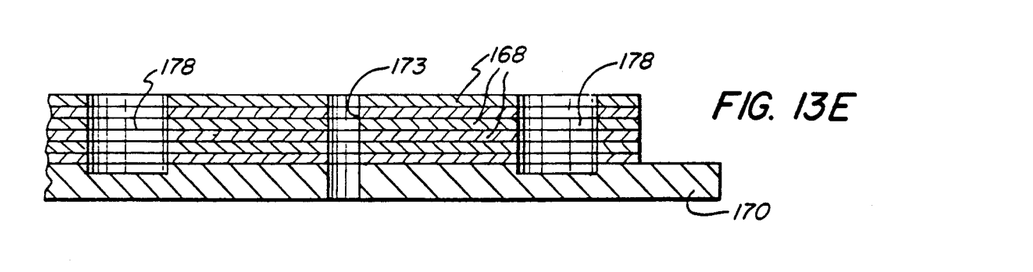

In FIG. 13E, the rivets 174 have been drilled out of the stack of workpieces 168 so that they can be disassembled from each other and from the base plate 170.

In operation of the apparatus of the present invention, cartridges 66 containing the various drill bits, reaming bits and other rotary tools to be used in machining a particular group of workpieces is selected. These cartridges are then placed in a predetermined order in rows on the platform 60 of the tool storage assembly 32. The information concerning the tools and their orientation within the rows on the storage platform 60 is introduced into the computer memory through the computer console 36.

A stack of sheet metal workpieces 168 is assembled upon a sheet metal base plate 70 and clamped thereon. The clamped stack is moved on the worktables 16, 18 into engagement with the guidance system 24 and clamped therein.

Information concerning the contours and tools to be used for cutting the various contours in the stack of workpieces is entered into the computer memory. Also entered is information concerning the placement of holes in which rivets are to be secured to secure the stack of metal workpieces to the base plate as the metal is being cut thereabout.

The information entered into the computer is then processed by the computer program to select a cartridge 66 containing the appropriate size drill bit for drilling the holes in which the rivets are to be seated, and a tool carrier 56 is moved on its carriage 72 into vertical alignment therewith. The tool carrier 56 is then moved downwardly on the vertical rails 80 to engage between its jaws 86 the plate 106 on the cartridge 66. The carrier 56 is moved upwardly and then forwardly along its rail 52 to a position adjacent the overhead arm 14, and the carrier 56 moves sideways on the cross slide 78 into Y-axis alignment with the rotary tool drive assembly 28. The closure elements 126, 128 are opened and the carrier 50 is moved forwardly into vertical axial alignment with the rotary drive assembly 28 which has its slide carrier 130 in an upper position. The slide carrier 130 is moved downwardly causing the arbor of the drill bit to move thereinto and to be engaged therewithin, and the stripper plate in the carrier 56 is engaged in the bed 12. The carrier 56 is moved outwardly in the Y-axis leaving the tools in the rotary drive assembly 28. The closure elements 126, 128 are moved into their closed position, and the carrier 56 with the now empty cartridge 66 moves on its cross slide 78 into a position to one side.

In the meantime, the computer control has caused another tool carrier 56 to pick up a cartridge 66 containing the next tool required for the machining program, and the carriage 66 has moved the tool carrier 56 containing the second tool to a standby position to the opposite side of the overhead arm 14.

The rotary tool drive assembly 28 is actuated by the computer and a series of holes are drilled in the clamped and assembled stack, with the rotary tool drive assembly 28 being elevated after each drilling operation to permit the stack to be moved in the X and Y axes by the guidance assembly 24.

After all of the holes have been drilled, the guidance assembly 24 now moves the assembled stack of workpieces relative to the riveting assembly 30 wherein rivets are inserted into each of the drilled holes and deformed to firmly secure the stack of workpieces to the base plate against relative movement.

When this operation is completed, the closure elements 118, 120 open, the first carrier 56 moves into alignment with the rotary tool drive assembly 28 to collect the drill bit and its stripper plate, and thereafter it moves outwardly of the rotary tool drive assembly area and into a position spaced from the other tool carrier 56. The second tool carrier 56 containing the next tool is now moved sideways on its cross slide 78 and then inwardly into vertical alignment with the rotary tool drive assembly 28 so that its tooling is now deposited therein, after which the carrier 56 is moved outwardly and into a standby position.

The closure elements 126, 128 are pivoted into the closed position and the machining operation utilizing this tool is conducted. At the same time, the carrier 56 containing the cartridge 66 with the drill bit is moved back to the tool storage assembly 32 and the cartridge deposited in its original position. This carrier 56 may now be moved into a position to pick up the next tool required, and it is moved into a standby position adjacent the overhead arm 14.

This process continues until all of the desired drilling and milling or routing operations have been completed.

The final operation involves the insertion of a drill bit of the original diameter (or slightly larger if so desired) into the rotary tool drive assembly 28 and the drilling of the rivets from the stack which had been used to maintain the workpieces in assembly on the base plate during the various operations. The stack of workpieces and the base plate are then moved outwardly on the worktables 16, 18 to a discharge position and a new stack is ready to be positioned in the machine.

It will be appreciated that the machine of the present invention enables rapid, numerically controlled drilling and routing of aluminum and other sheet metal stock. The riveted stack is readily moved relative to the principal workstation with a degree of accuracy because of the firm engagement of the workpieces, and the parts being produced therefrom are secured to the base plate.

Tools may be rapidly substituted in the rotary tool drive assembly by the pair of tool carriers. One tool carrier available to extract tools from the rotary tool drive assembly while the other carrier is returning to the storage assembly with the tool from the previous operation and obtaining the tooling for the next operation. The remote tool storage assembly and tool changer assembly enables great versatility in tool selection and use and it permits substitution of special tools in the tool storage assembly while the machining is in process.

The motion of the stack of workpieces and of the carriers is precisely controlled by the guidance system for the workpieces, and by the hydraulic, pneumatic and electric drive systems utilized for the tool changer assembly.

Thus, it can be seen from the foregoing detailed description and drawings that the machine tool of the present invention enables the drilling, riveting and machining a multiplicity of stacked workpieces with automatic and rapid exchange of tools in the rotary tool drive assembly. Only two work stations are required to simplify the programming of the X-Y guidance system, and the tools may be rapidly exchanged with the next tool waiting in a position to be rapidly inserted into the mechanism after the first tool is removed.

Having thus described the invention, what is claimed is:

1. In a machine for the simultaneous machining of a stack of plate-like workpieces, the combination comprising:
   (a) a frame having an overhead arm portion;
   (b) a worktable below said arm portion;
   (c) a workpiece guidance assembly for moving a stack of workpieces on said worktable below said arm along a Y-axis parallel to said arm and an X-axis perpendicular thereto;
   (d) a rotary tool drive assembly on said arm portion defining a first work station;
   (e) a riveting assembly in said arm portion defining a second work station, said riveting station being spaced in the X-axis from said first work station;
   (f) a tool storage assembly spaced in said Y-axis from said arm, said tool storage assembly having a support portion adapted to store a multiplicity of tools in a plurality of rows extending in said Y-axis, said rows being spaced apart along said X-axis;
   (g) a tool changer assembly comprising:
      (i) a pair of carrier rails extending in said Y-axis from said tool storage assembly to adjacent said rotary tool drive assembly, said rails being spaced in said X-axis to opposite sides of said tool drive assembly; and
      (ii) a pair of tool carriers reciprocatable on said rails for transporting tools between said tool storage assembly and said rotary tool drive assembly to effect insertion into and removal from said tool assembly of tools, said tool carriers being vertically movable relative to said rails to engage tools stored in said tool storage means and to cooperate with said rotary tool drive assembly to effect insertion of tools thereinto and removal of tools therefrom, said tool carriers being movable on said rails in said X-axis for movement between a first position in alignment with said rotary tool drive means and a second position spaced to the side thereof; and
   (h) computer control means riveting and rotary tool drive assemblies and said tool changer and workpiece guidance assemblies.

2. The machine of claim 1 wherein there is included a multiplicity of tool storage cartridges on said support portion of said tool storage assembly, said tool carriers being adapted to grip said tool storage cartridges to effect movement thereof.

3. The machine of claim 2 wherein each of said cartridge is adapted to store a tool having a shank extending upwardly therefrom for engagement in said rotary tool drive means, said tool carriers being movable downwardly and upwardly relative to said rotary tool drive assembly and including releasable tool engaging means to effect tool engagement in said drive means and tool removal therefrom.

4. The machine of claim 3 wherein said cartridges are adapted to seat releasably a stripper, and said rotary tool drive assembly includes a stripper support portion, and wherein said vertical movement of said carrier relative to said tool drive assembly is adapted to deposit or remove the stripper in and from said stripper support portion.

5. The machine of claim 2 wherein there are provided two rows of tool cartridges in said tool storage assembly and wherein there is included means for relative movement in the X-axis between said rows of cartridges and said tool carriers to effect vertical alignment thereof.

6. The machine of claim 2 wherein said tool carriers are movable along said rails in the Y-axis vertically (the Z-axis) and transversely thereof in the Y-axis.

7. The machine of claim 1 wherein there is included a closure on said frame providing a protective closure about said workstations and movable between a first protective position disposed about said rotary tool drive assembly and riveting assembly and a second open position in which said carriers may travel on said rails to and from said assemblies.

8. The machine of claim 7 wherein said closure includes a pair of doors pivoted on said frame and means for opening and closing said doors, said opening and closing means being controlled by said computer control means.

9. In a machine for the simultaneous machining of a stack of plate-like workpieces, the combination comprising
   (a) a frame having an overhead arm portion;
   (b) a worktable below said arm portion;
   (c) a workpiece guidance assembly for moving a stack of workpieces on said worktable below said arm along a Y-axis parallel to said arm and an X-axis perpendicular thereto;
   (d) rotary tool drive assembly on said arm portion defining a first work station;
   (e) a riveting assembly in said arm portion defining a second work station, said riveting station being spaced in the X-axis from said first work station;
   (f) a tool storage assembly spaced in said Y-axis from said arm, said tool storage assembly having a support portion adapted to store a multiplicity of tools in a plurality of rows extending in said Y axis, said rows being spaced apart along said X-axis;
   (g) a tool changer assembly comprising:
      (i) a pair of carrier rails extending in said Y-axis from said tool storage assembly to adjacent said rotary tool drive assembly, said rails being spaced in said X-axis to opposite sides of said tool drive assembly; and
      (ii) a pair of tool carriers reciprocatable on said rails for transporting tools between said tool storage assembly and said rotary tool drive assembly to effect insertion into and removal from said tool assembly of tools, said tool carriers being vertically movable relative to said rails to engage tools stored in said tool storage means and to cooperate with said rotary tool drive assembly to effect insertion of tools thereinto and removal of tools therefrom, said tool carriers being movable on said rails in said X-axis for movement between a first position in alignment with said rotary tool drive means and a second position spaced to the side thereof; and (h) computer control means operative to control said riveting and rotary tool drive assemblies and said tool changer and workpiece guidance assemblies;

(i) a multiplicity of tool storage cartridges on said support portion of said tool storage assembly, said tool carriers being adapted to grip said tool storage cartridges to effect movement thereof;

(j) there are provided two rows of tool cartridges in said tool storage assembly and wherein there is included means for relative movement in the X-axis between said rows of cartridges and said tool carriers to effect vertical alignment thereof; and (k) tool carriers are movable along said rails in the Y-axis vertically (the Z-axis) and transversely thereof in the Y-axis.

10. The machine of claim 9 wherein each of said cartridge is adapted to store a tool having a shank extending upwardly therefrom for engagement in said rotary tool drive means, said tool carriers being movable downwardly and upwardly relative to said rotary tool drive assembly and including releasable tool engaging means to effect tool engagement in said drive means and tool removal therefrom, and said cartridges are adapted to seat releasably a stripper, and said rotary tool drive assembly includes a stripper support portion, and wherein said vertical movement of said carrier relative to said tool drive assembly is adapted to deposit or remove the stripper in and from said stripper support portion.

11. The machine of claim 9 wherein there is included a closure on said frame providing a protective closure about said workstations and movable between a first protective position disposed about said rotary tool drive assembly and riveting assembly and a second open position in which said carriers may travel on said rails to and from said assemblies, said closure includes a pair of doors pivoted on said frame and means for opening and closing said doors, said opening and closing means being controlled by said computer control means.

12. A method for simultaneously machining a stack of plate-like workpieces comprising:

(a) assembling a stack of plate-like workpieces on a base plate;

(b) clamping said stack of workpieces on said base plate;

(c) providing a machine tool with a frame and an overhead arm with a rotary drive assembly defining a first work station and a riveting assembly defining a second work station;

(d) providing a worktable below said arm portion in which workpieces may be moved along a Y-axis parallel to said arm portion and an X-axis perpendicular thereto through said work stations;

providing a tool storage assembly spaced from said arm in said Y-axis with a support portion adapted to store a multiplicity of tools in a plurality of rows extending in said Y-axis;

(f) providing a tool changer assembly comprising:
  (i) a pair of carrier rails extending in said Y-axis from said tool storage assembly to adjacent said rotary tool drive assembly and spaced in said X-axis to opposite sides thereof; and
  (ii) a pair of tool carriers reciprocatable on said rails for transporting tools between said tool storage assembly and said rotary tool drive assembly;

(g) vertically moving one of said carriers relative to its rail to engage a drill stored on said support portion of said tool storage means;

(h) moving said carrier on said rail to a position adjacent said arm portion;

(i) moving said tool carrier on said rail in said X-axis into alignment with said rotary tool drive means;

(j) moving said tool carrier relative to said rotary tool drive means to engage said drill therein;

(k) moving said tool carrier on said rail in said X-axis to a position to the side of said arm;

(l) moving said assembled stack relative to said first work station of said rotary drive assembly to drill a multiplicity of holes therein;

(m) moving said assembled stack relative to said riveting station and engaging rivets in said holes;

(n) moving said tool carrier on said rail to remove said drill from said rotary drive assembly;

(o) vertically moving a second tool carrier on the other of said rails to engage a milling tool;

(p) moving said second tool carrier on said other drive rail to insert said milling tool in said rotary drive assembly;

(q) moving said assembled stack relative to said rotary drive station to machine desired patterns in said workpieces;

(r) moving said tool carrier on said other rail to remove said milling tool;

(s) engaging a drill in one of said tool carriers;

(t) advancing and moving said one tool carrier on its rail to insert said drill in said rotary drive assembly; and (u) moving said assembled stack relative to said first work station and drilling said rivets to remove them and thereby permit disassembly of said workpieces of said stack from said base plate.

13. The machining method in accordance with claim 12 wherein there are included the additional steps of replacing milling tools in said tool carriers and thereby in said rotary drive assembly and moving said stack relative thereto to effect machining of various patterns in said workpieces of said stack.

14. The machining method in accordance with claim 12 wherein there are provided two rows of tool cartridges in said tool storage assembly extending parallel to said rails and wherein said support portion is moved relative to said rails in the X-axis to effect vertical alignment of said rows of cartridges and said tool carriers.

15. The machining method in accordance with claim 12 wherein there are included movable closure on said frame; and where said closure is moved between a protective position about said work stations and a second position in which said carriers may pass thereby.

* * * * *